US007320472B2

(12) United States Patent
Gregory et al.

(10) Patent No.: US 7,320,472 B2
(45) Date of Patent: Jan. 22, 2008

(54) CART FOR STOCKING INVENTORY AND METHODS FOR MAKING SAME

(75) Inventors: Hugh Donald Gregory, Rogers, AR (US); Muriel A. McSweeny, Lowell, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 11/690,947

(22) Filed: Mar. 26, 2007

(65) Prior Publication Data

US 2007/0187916 A1    Aug. 16, 2007

Related U.S. Application Data

(63) Continuation of application No. 10/874,655, filed on Jun. 23, 2004, now Pat. No. 7,213,816.

(51) Int. Cl.
*B62B 1/00* (2006.01)

(52) U.S. Cl. ............... 280/79.3; 280/79.1; 280/36; 280/47.35; 280/33.99; 280/36 R; 280/79.2

(58) Field of Classification Search ............ 280/33.99, 280/47.35, 36 R, 36, 79.3, 79.2, 79.1
See application file for complete search history.

(56) References Cited

U.S. PATENT DOCUMENTS

| | | | | | |
|---|---|---|---|---|---|
| 3,628,805 | A | * | 12/1971 | Archer | 280/33.998 |
| 3,840,242 | A | * | 10/1974 | Craig et al. | 280/33.996 |
| 3,971,568 | A | * | 7/1976 | Wright | 280/33.996 |
| 3,977,689 | A | * | 8/1976 | Rosa | 280/33.996 |
| 4,678,090 | A | * | 7/1987 | Ross | 211/150 |
| 7,185,899 | B2 | * | 3/2007 | Thiede et al. | 280/47.35 |
| 7,213,816 | B2 | * | 5/2007 | Gregory et al. | 280/47.35 |

* cited by examiner

*Primary Examiner*—Christopher P. Ellis
*Assistant Examiner*—Cynthia F. Collado
(74) *Attorney, Agent, or Firm*—Priest & Goldstein, PLLC

(57) ABSTRACT

A cart is described that has a wheeled base and an upright frame extending upwardly from the base. A side frame extends upwardly from the base and abuts the upright frame. The upper face of the base, the front face of the upright frame and the inside face of the side frame together form an open cargo bay. A horizontal work surface projects outward from the rear face of the upright frame. A storage compartment is attached to the rear face of the upright frame below the work surface.

4 Claims, 8 Drawing Sheets

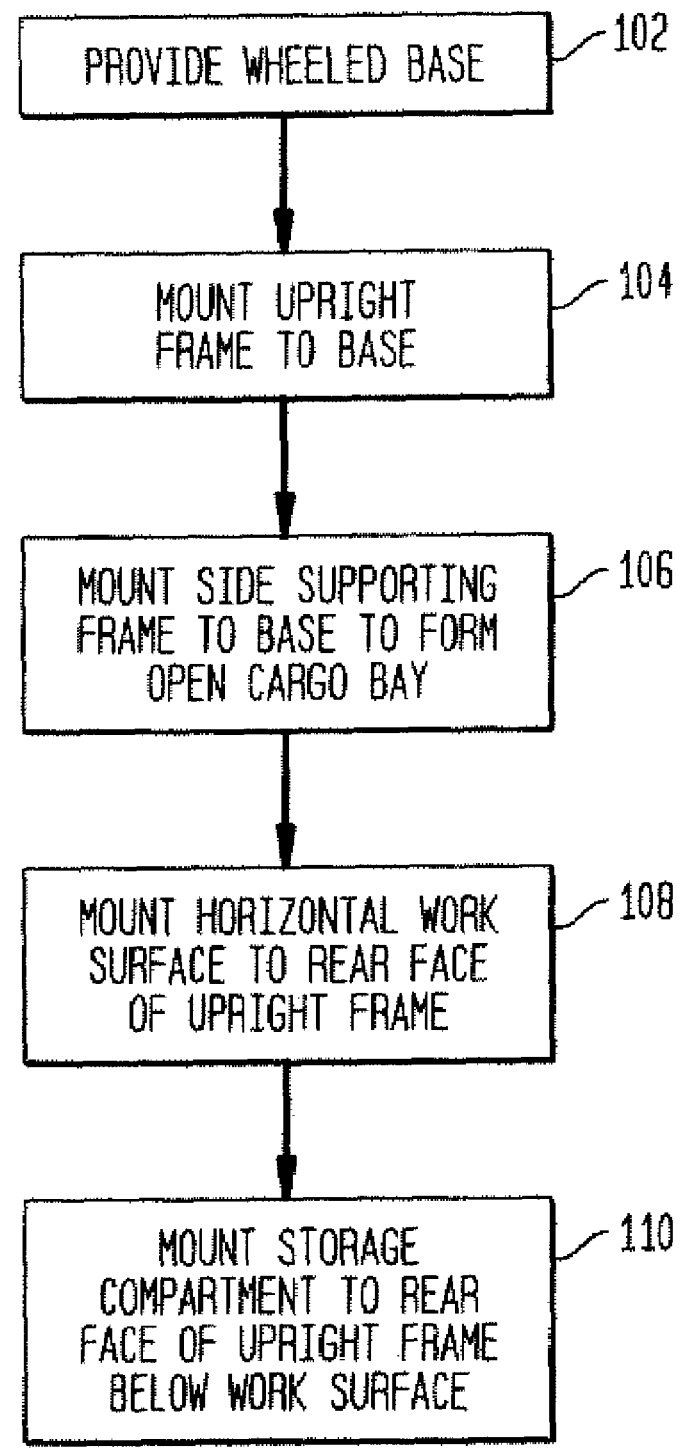

CART FOR STOCKING INVENTORY AND METHODS FOR MAKING SAME

This application is a continuation of U.S. Ser. No. 10/874,655 filed Jun. 23, 2004 now U.S. Pat. No. 7,213,816 which is incorporated by reference herein in its entirety.

BACKGROUND OF THE INVENTION

1. Field of the Invention

The present invention relates generally to improvements in the field of retailing, and more particularly to advantageous aspects of an improved cart for stocking inventory and methods for making same.

2. Description of Prior Art

An important part of the efficient management of a retail store is the restocking function. Retail shelves need to be kept well stocked for a number of reasons. First, well stocked shelves contribute to the ambience of a store. Second, well stocked shelves tend to ensure that all customers will be able to purchase the items that they are seeking, without annoying delays. Third, well stocked shelves also tend to ensure that the store's inventory storage space is being used efficiently, and help a store determine more precisely when to reorder inventory from suppliers.

Retail inventory typically consists of individual packages that are placed on a shelf or arranged in other types of displays. These individual packages are typically transported and stored in relatively large boxes made out of corrugated cardboard.

A store employee typically transports one or more of these large cardboard boxes to the area of the store requiring restocking. Once the box or boxes is in position, the employee then opens the box, removes individual packages, and then places them onto the shelf or display. Often, different types of items are restocked at the same time. In that case, the employee may transport a number of different boxes on a cart. The cart is then rolled to each location, where the appropriate box is cut open. After a shelf or display has been restocked, the cart is then repositioned.

In the past, it was possible to perform the restocking function with relative ease. Restocking could be performed after hours or during slow times of the shopping day. However, as profit margins continue to narrow, it has become necessary for retail stores to increase the number of hours of operation and to increase customer traffic as much as possible. Because of this increase in customer volume, the restocking function has become more important than ever. However, because of the increased number of customers in the aisles and because of the increased number of shopping hours, it has become increasingly difficult to perform the restocking function in an efficient manner.

SUMMARY OF THE INVENTION

Such issues and others are addressed by the present invention, an aspect of which provides a cart having a wheeled base and an upright frame extending upwardly from the base. A side frame extends upwardly from the base and abuts the upright frame. The upper face of the base, the front face of the upright frame and the inside face of the side frame together form an open cargo bay. A horizontal work surface projects outward from the rear face of the upright frame. A storage compartment is attached to the rear face of the upright frame below the work surface.

Additional features and advantages of the present invention will become apparent by reference to the following detailed description and accompanying drawings.

BRIEF DESCRIPTION OF THE DRAWINGS

FIG. 9 shows a flowchart of a method according to a further aspect of the invention for fabricating a restocking cart.

DETAILED DESCRIPTION

An aspect of the present invention provides a cart for use by store employees to stock shelves or other types of displays in a retail store environment. It should be noted that the cart described herein may also be used to perform other functions in other environments without departing from the spirit of the invention. The cart includes an open cargo bay for holding boxes containing items to be shelved. Behind the cargo bay there is provided a horizontal work surface. The cart is designed so that a store employee may easily remove a box from the cargo bay and place it on the work surface.

Once the box has been placed on the work surface, the employee may then use a pocket utility knife or other cutting device to open the box to gain access to its contents. The box may then remain on the work surface as the display is being restocked. Once the box is empty, the employee may then "break down" the box by opening its bottom and collapsing the box into a flat configuration. A storage compartment is provided underneath the work surface to receive flattened boxes.

According to a further aspect of the invention, the cart includes a removable cantilevered shelf that extends horizontally across the open cargo bay, dividing it into upper and lower sections. The cart further includes a shelf storage bay for storing the cantilevered shelf when it is not in use. According to a further aspect of the invention, the cart is designed to be strong, lightweight, and easily maneuverable down an aisle in a retail store, even when that aisle is crowded with customers and their shopping carts.

Figure 1:
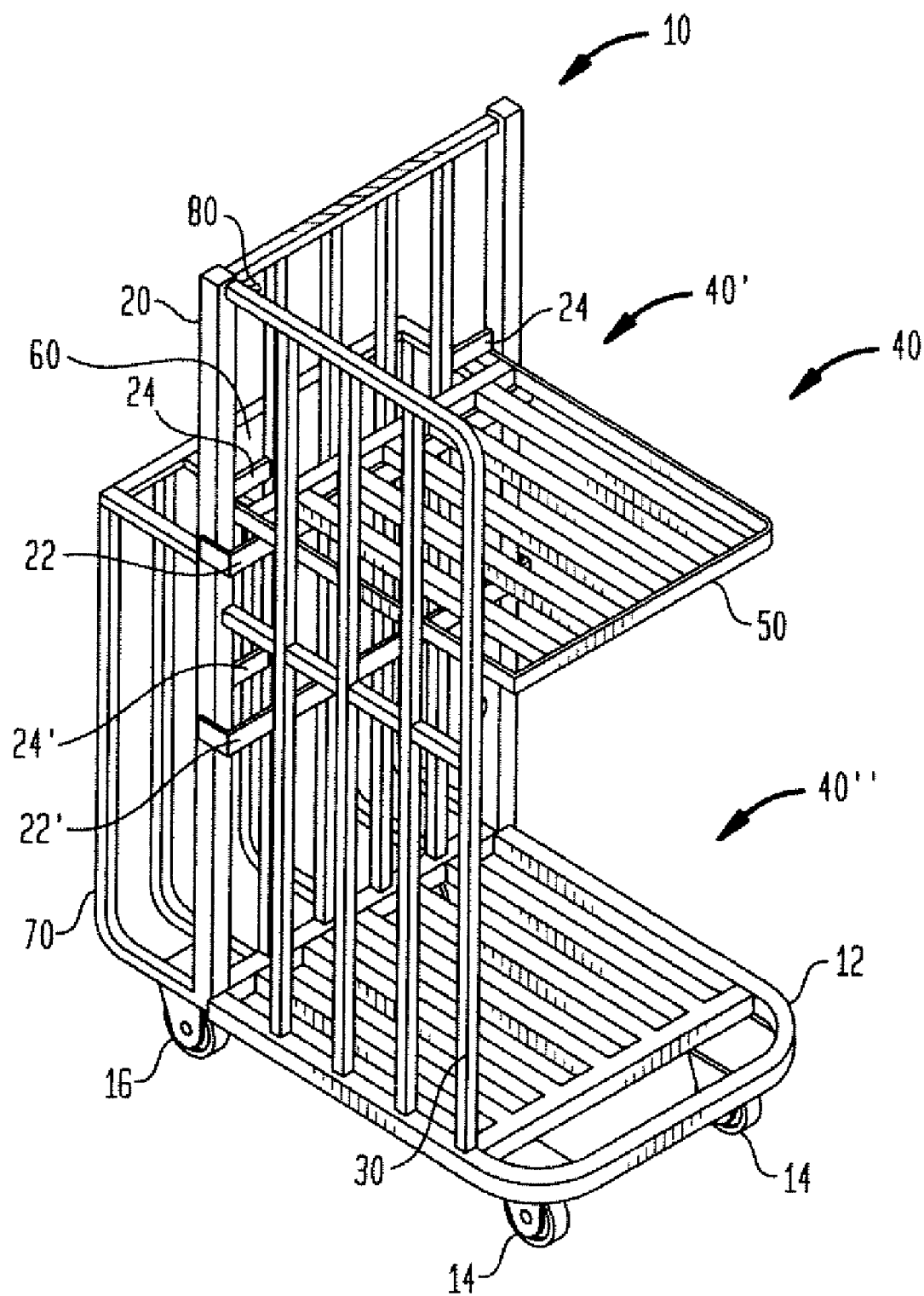
FIG. 1 shows a perspective view of a cart according to a first aspect of the invention.

FIG. 1 shows a perspective view of a cart 10 according to a first aspect of the invention. The cart 10 includes a wheeled base 12 having an upper face and a lower face. A pair of front casters 14 and a pair of rear casters 16 are mounted to the lower face of the base 12. According to a further aspect of the invention, the front casters 14 may be swivel mounted, and the rear casters 16 may be fixedly mounted. The fixed mounting of the rear casters 16 facilitates forward tracking of the cart 10 when it is pushed from behind. The swivel mounting of the front casters 14 allows the cart 10 to be easily steered.

Extending upward from the base 12 is an upright frame 20, having a front face and a rear face. Also extending upward from the base 12 is a side support frame 30 having an inside face and an outside face. The side support frame 30 abuts the upright frame 20. As shown in FIG. 1, the upper face of the base 12, the front face of the upright frame 20, and the inside face of the side support frame 30 together define a cargo bay 40. According to the present aspect of the invention, the cargo bay 40 is open at the top, front, and left side of the cart 10. However, it will be apparent from the present description that the configuration of the cargo bay 40 may be modified without departing from the spirit of the present invention. For example, the cart 10 may be modified so that the cargo bay 40 is open at the right side of the cart 10 rather than at the left side.

According to another aspect of the invention, there is further provided a removable cantilevered shelf 50 that extends horizontally across the cargo bay 40, dividing it into upper and lower sections 40' and 40". As described in further detail below, the shelf 50 is removably attached to the upright frame 20. The upright frame 20 includes a pair of shelf supporting bars 22 and 22' extending across the upright frame 20. The lower of the two shelf supporting bars 22' is used to support the shelf 50 in a lower position. The higher of the two shelf supporting bars 22 is used to support the shelf 50 in a higher position. At each shelf supporting bar 22 and 22', there is provided a pair of shelf stops 24 and 24'. The shelf stops 24 and 24' engage a notch at one end of the shelf 50. The attachment of the shelf 50 to the shelf supporting bars 22 and 22' and the shelf stops 24 and 24' is described in detail below.

According to a further aspect of the invention, the base frame 12, upright frame 20, side frame 30, and shelf 50 are fabricated from aluminum tubes that have been welded together into a sturdy framework. The tubes have a square profile. The use of aluminum tubes allows for the construction of a lightweight, strong, durable structure. Plastic caps may be used, as desired, to plug up any exposed tube openings.

It will be seen in FIG. 1 that in each of the base frame 12, upright frame 20, side frame 30, and shelf 50, the tubes are spaced apart at regular intervals. This spacing is useful for a number of reasons. First, it minimizes the amount of material required to fabricate the cart. Second, it provides for high visibility, allowing a store employee to quickly determine from different viewing angles what items are currently loaded onto the cart. Third, each tube in the cart 10 may be used as a gripping surface for moving the cart 10. Fourth, an item may be secured to the cart 10 by using a rope, string, or bungee cord that is threaded through or attached to a tube or tubes.

It will be appreciated, however, that it would be possible to modify the types of materials used to fabricate the cart without departing from the spirit of the invention. For example, tubes fabricated from other materials, such as other metals, plastic, wood, or the like, may be used. The tubes may also have different profiles, including, for example, a round profile or a rectangular profile. Different types of tubes may be combined. Also, solid bars may be used in place of tubes.

Figure 2:
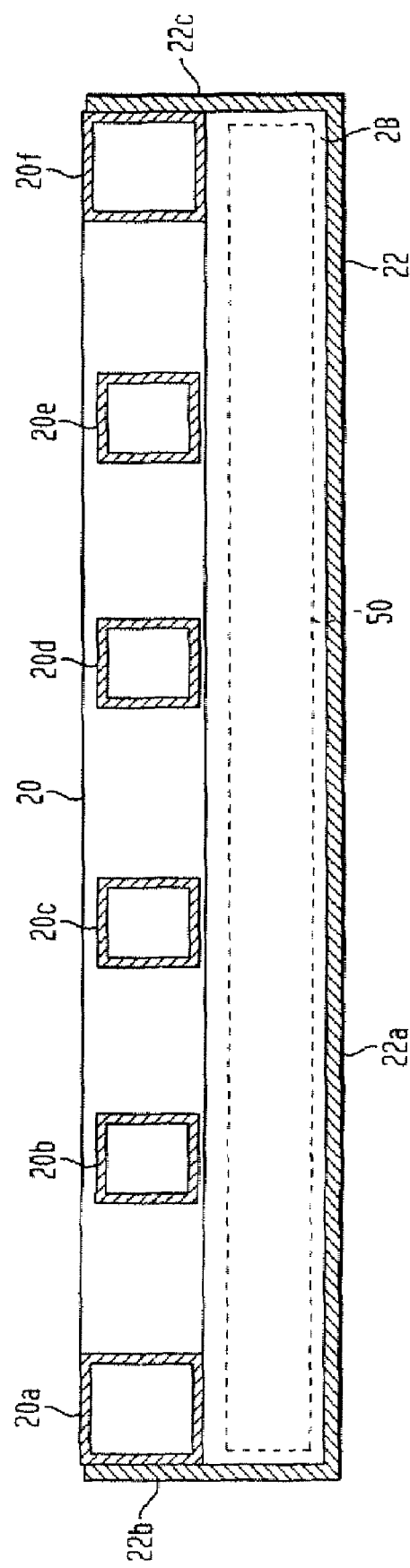
FIG. 2 shows a cross section of a shelf storage bay according to a further aspect of the invention.

A further aspect of the invention provides a shelf storage bay for storing the shelf 50 after it has been detached from the cart 10. FIG. 2 shows a top cross sectional view, not drawn to scale, of a portion of the upright frame 20 and the upper shelf supporting bar 22. As shown in FIG. 2, the upright frame 20 includes a pair of outside tubes 20*a* and 20*f* having a larger diameter than inside tubes 20*b-e*. The outside tubes 20*a* and 20*f* may suitably be 1.5"sq×0.125" aluminum tube. The inside tubes 20*b-e* may suitably be 1" sq×0.063" aluminum tube. As shown in FIG. 2, according to this aspect of the invention, the shelf supporting bar 22 has a generally U-shaped profile, and includes a crossbar 22*a* and a pair of supporting legs 22*b* and 22*c*. The upper and lower shelf supporting bars 22 and 22' may suitably be fabricated from 0.25"×1.5" aluminum flat stock.

It will be seen from FIG. 2 that the upright frame 20 and the shelf supporting bar 22 together define a substantially rectangular opening 28. This rectangular opening 28 is shaped to closely receive the shelf 50 when the shelf 50 is slid lengthwise down into the opening 28. The lower shelf supporting bar 22' and the upright frame 20 together define a similarly shaped opening (not shown). The upper and lower self supporting bars 22 and 22' and the upright frame 20 are positioned with respect to each other to define a storage bay for the shelf 50 when it has been detached from the cart 10. The bottom of the storage bay is provided by the upper face of the base 12.

The shelf 50 is inserted into its storage bay by sliding an end of the shelf 50 in a downward direction through the opening 28 defined by the upright frame 20 and the upper and lower shelf supporting bars 22 and 22'. Because the opening 28 closely fits around the shelf 50, it will be necessary to hold the shelf 50 in a substantially vertical orientation to allow it to be slid into position. If necessary, the front face of the upright support 20 can be used as a guiding surface to facilitate the sliding of the shelf 50 into the storage bay. The shelf 50 is slid downward until the end of the shelf 50 rests on the upper face of the base 12. When the shelf 50 is fully seated in the storage bay, a portion of the shelf 50 protrudes above the upper shelf supporting bar 22. The shelf 50 is removed from the bay by grabbing the portion of the shelf 50 protruding above the upper shelf supporting bar 22 and pulling the shelf 50 upward until it is completely clear of the upper and lower shelf supporting bars 22 and 22'.

Returning to FIG. 1, it will be seen that a substantially horizontal work surface 60 projects rearwardly from the rear face of the upright frame 20. This work surface 60 may suitably be fabricated from 0.063" sheet aluminum. The work surface 60 has a height, shape, and size designed to provide a typical employee with a convenient surface on which to place a box containing inventory to be stocked onto a shelf or other display. As discussed above, it is contemplated that an employee will place a sealed box on the work surface 60, and use a utility knife or other tool to cut open the top of the box. The box remains on the work surface 60 as individual items are removed for stocking. Once the box is empty, the employee can then open the bottom of the box and collapse the box into a flattened configuration. It will be seen that, to stock shelves close in height with surface 60 or above surface 60, an employee can bend down once, lift a box onto work surface 60, open the box, and restock shelves with a substantially reduced amount of bending over.

As further shown in FIG. 1 there is provided underneath the work surface 60 a storage compartment 70 that can be used to store collapsed boxes. The storage compartment 70 is mounted to the upright frame 20 below the work surface 60. According to a presently preferred embodiment of the invention, the storage compartment 70 is fabricated from aluminum tubes that are spaced apart at regular intervals. The advantages of using aluminum tubes are discussed above. However, as discussed above, other types of tubes and materials may be used without departing from the spirit of the present invention. Because of the position of the storage compartment 70, it will be seen that the aluminum tubes used to fabricate the storage compartment 70 may be used as handles, or gripping surfaces, in rolling the cart through a store.

In one corner of the upright frame 20, there is provided a hook 80. The hook 80 may be used to hang bags, cutting tools, a clipboard, or the like. The position of the hook 80 may be modified without departing from the spirit of the invention.

Figure 3:
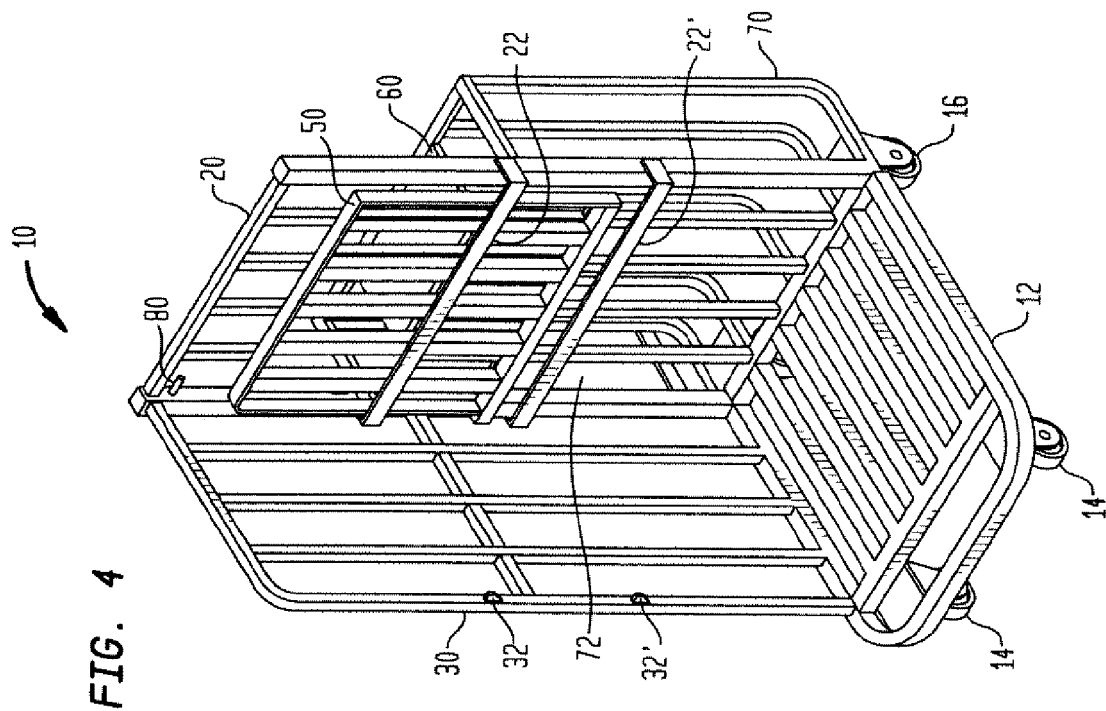
FIGS. 3 and 4 show additional perspective views of a modified version of the cart shown in FIG. 1.
Figure 4:
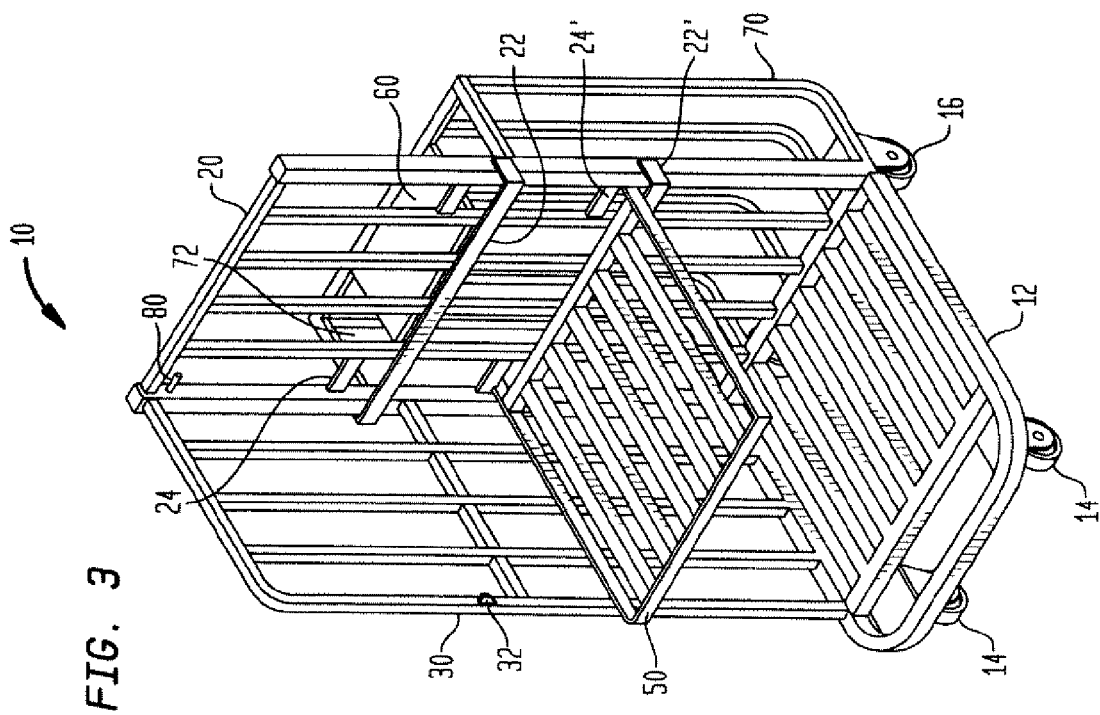

FIGS. 3 and 4 show two perspective views of the cart 10 shown in FIG. 1, from a reverse angle. In FIG. 3, the shelf 50 is attached to the lower shelf support 22'. In FIG. 4, the shelf 50 has been detached from the cart 10 and is in the process of being slid downward into the storage bay defined by the upper and lower shelf supporting bars 22 and 22'. As shown in FIGS. 3 and 4, the cart 10 has been modified by providing the cardboard storage compartment 70 with a side panel 72 to close one end of the compartment 70. The side panel 72 may suitably be fabricated from 0.030" sheet aluminum. Cardboard is inserted in the open end of the cardboard holding compartment 70. Once the compartment 70 is filled with cardboard, it can be easily emptied by pulling the flattened boxes out of the open end.

FIGS. 3 and 4 further illustrate upper and lower side shelf supports 32 and 32'. As discussed below, these side shelf supports 32 and 32' provide side support for the shelf 50 when the shelf 50 is attached to the upright frame 20. According to the present aspect of the invention, the side shelf supports 32 and 32' comprise nubs that are mounted to the outside tube of the side support frame 30.

Figure 5:
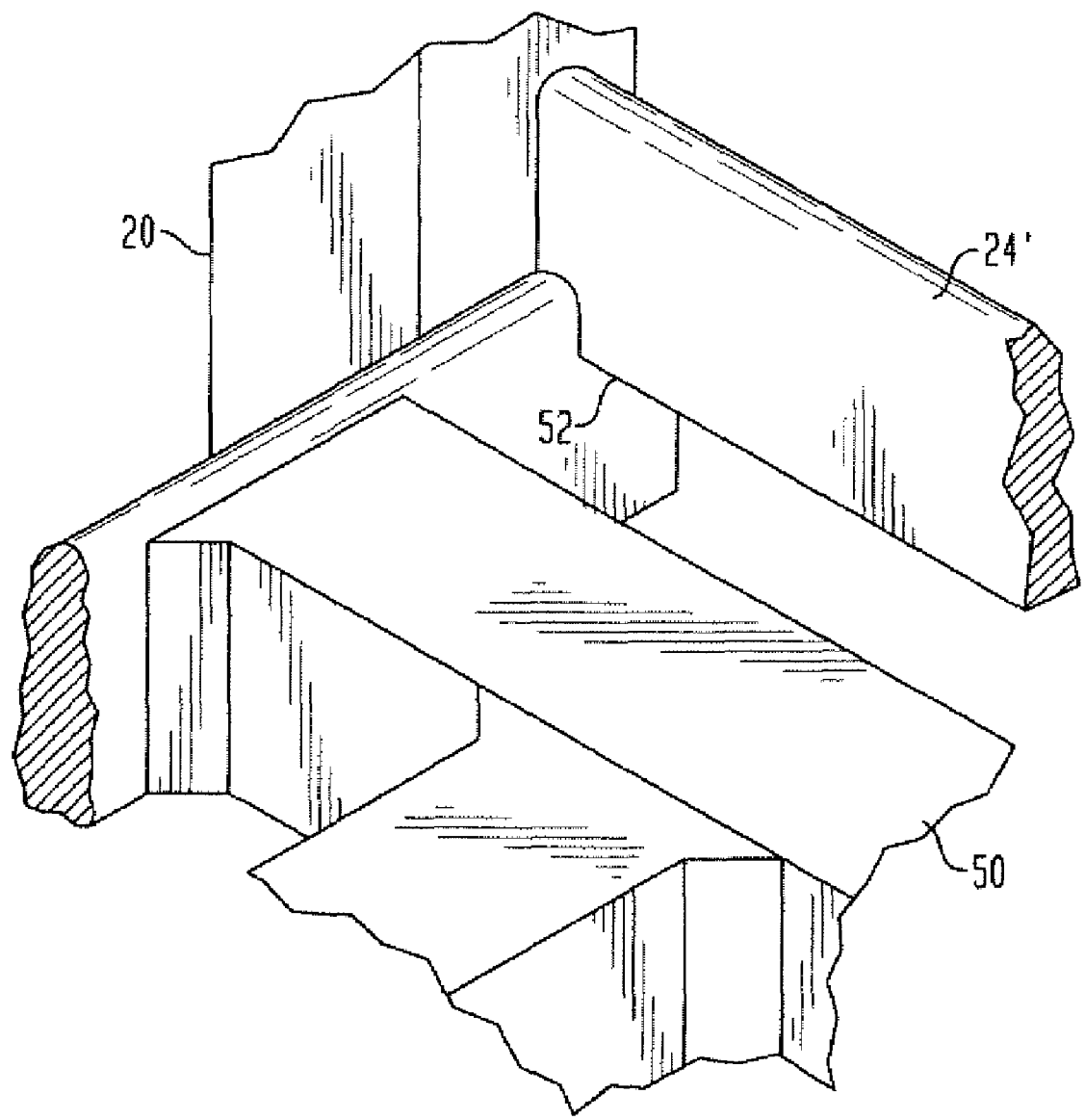
FIG. 5 shows a closeup perspective view of a portion of the cart shown in FIG. 3, illustrating the structural interrelationship between the shelf and the upright frame.
Figure 6:
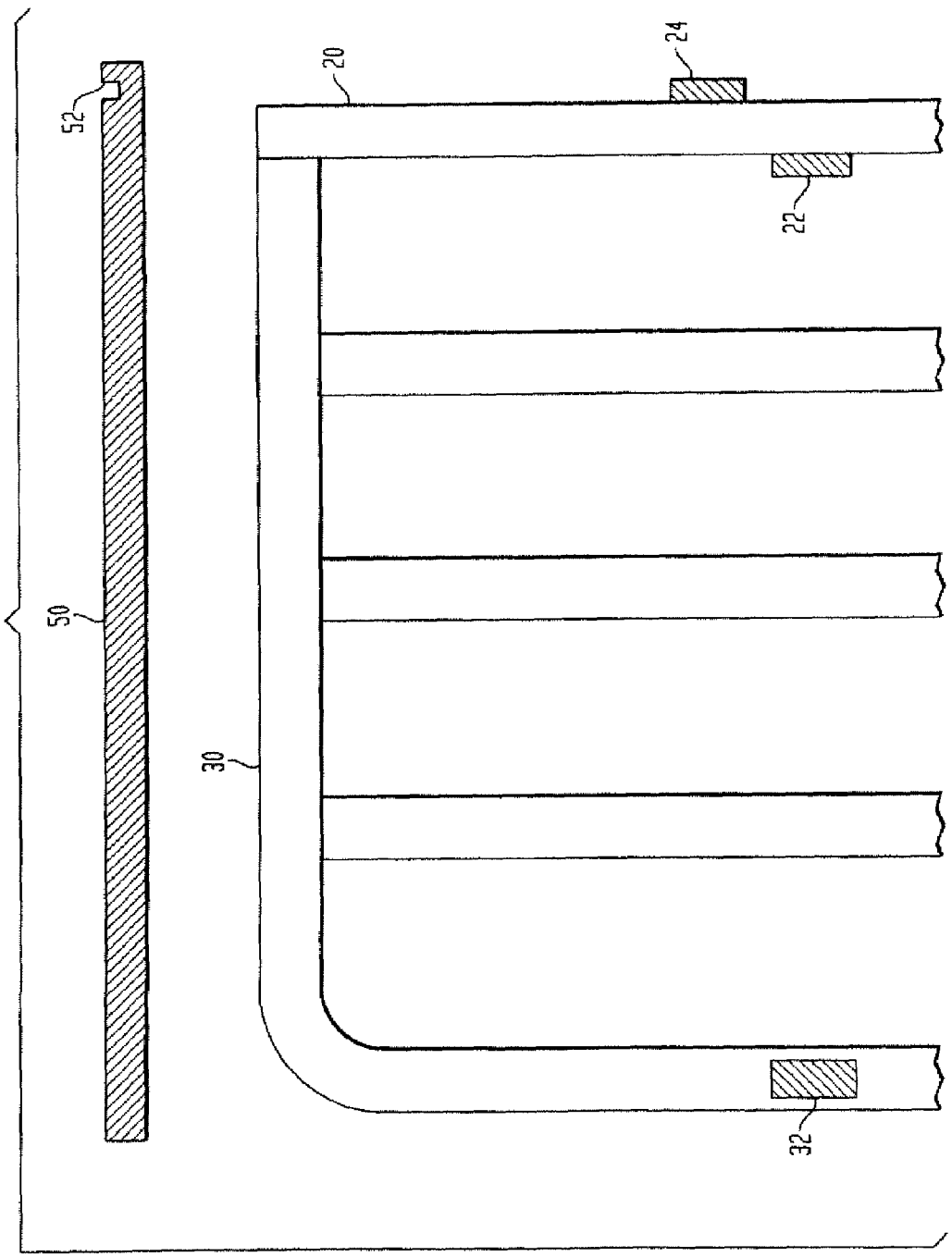
FIGS. 6-8 are a series of cross sections of a portion of the cart shown in FIG. 1, illustrating different stages in the attachment of the shelf to the upright frame.
Figure 7:
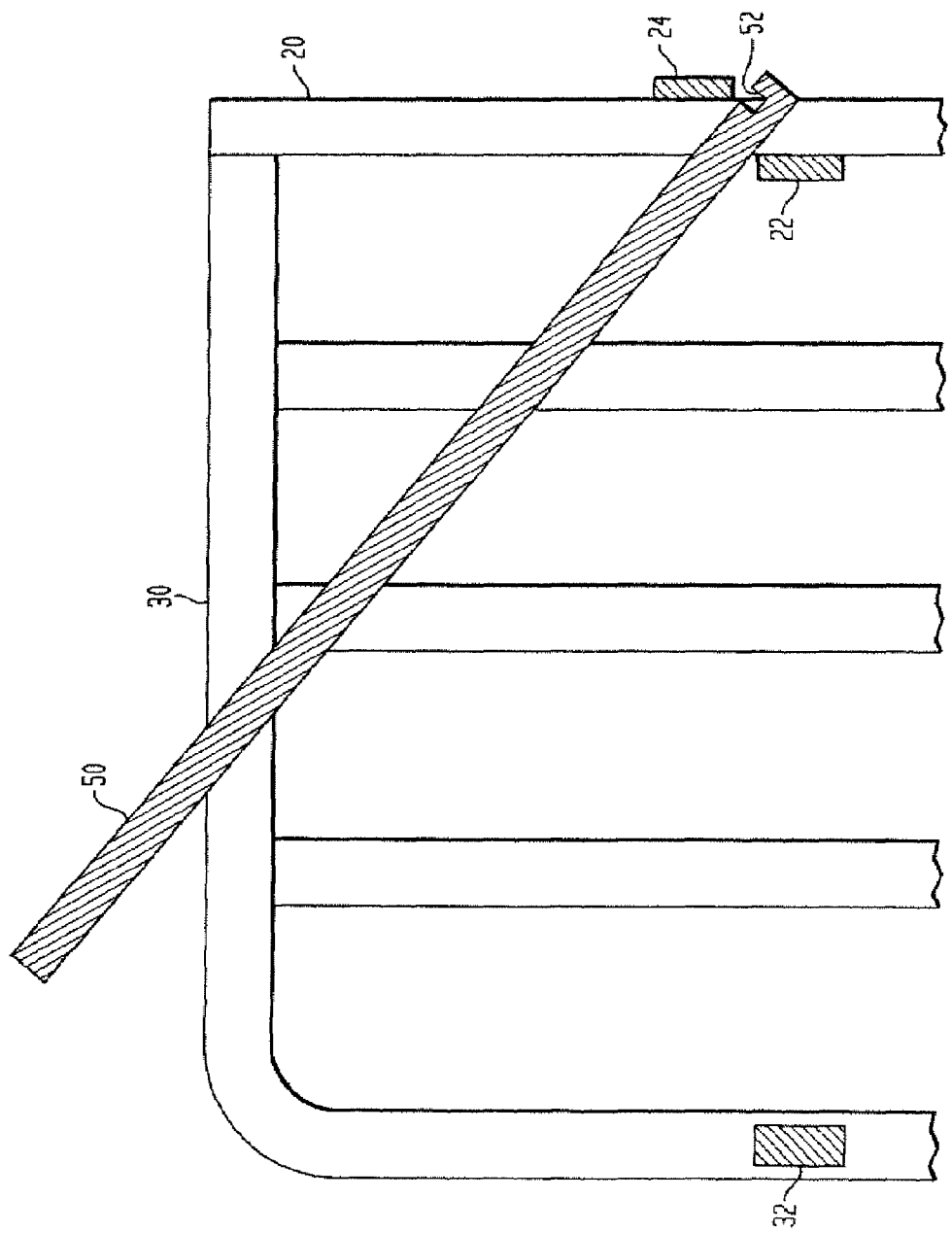
Figure 8:
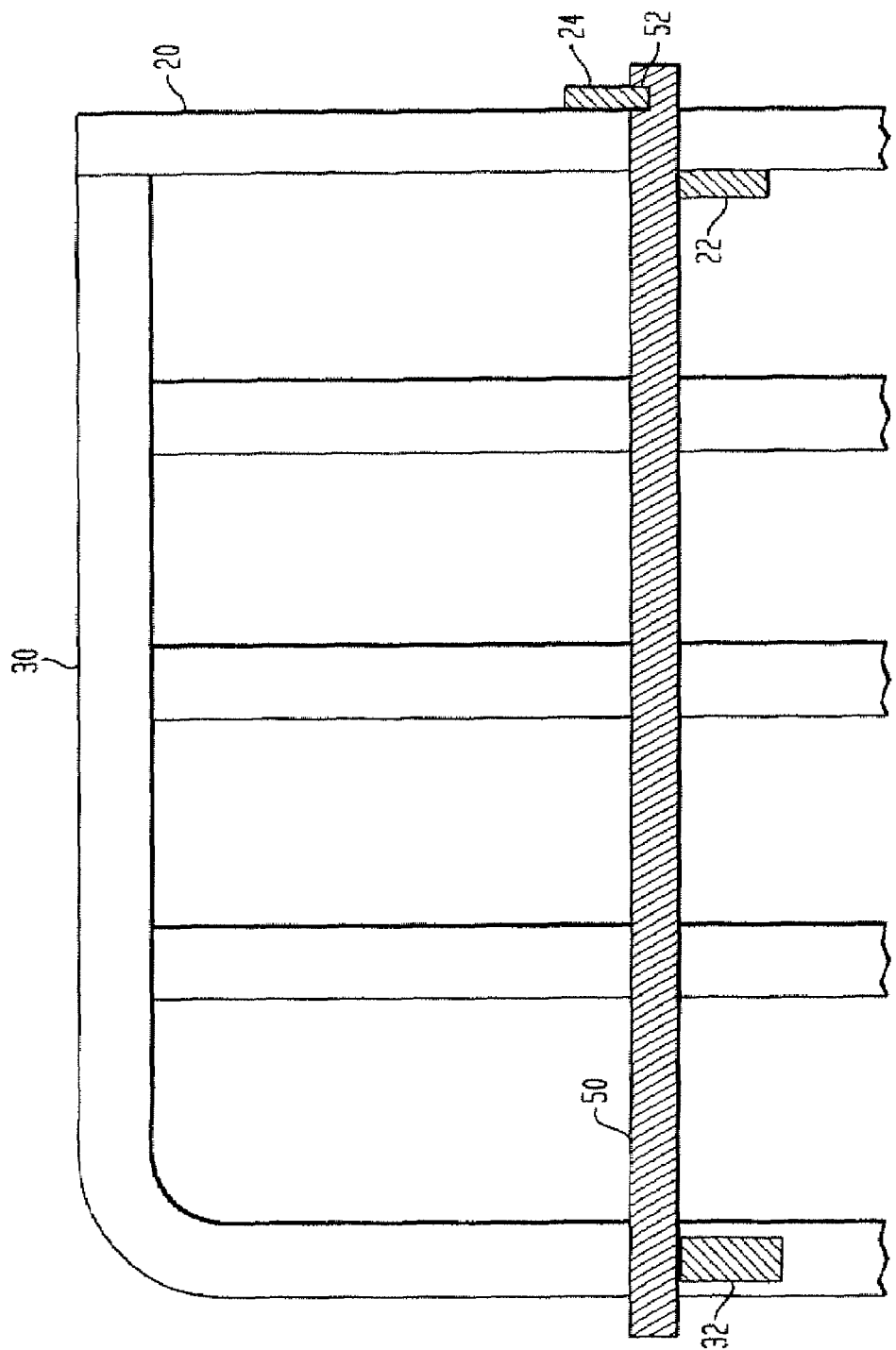

It should be noted that while FIGS. 3 and 4 show only a single shelf with two shelf positions, it would be possible to increase the number of shelves and shelf positions without departing from the spirit of the invention. It would also be possible to increase the size of the shelf storage bay to accommodate more than one shelf. Further, it would be possible to take a shelf from another cart to provide a second shelf FIG. 5 shows a closeup view of the circled region in FIG. 3, illustrating the attachment of one corner of the shelf 50 to the upright frame 20. FIGS. 6-8 are a series of drawings illustrating how the shelf 50 is attached to the cart 10 in a presently preferred embodiment of the invention. FIG. 6 shows an interior side view, not drawn to scale, of the upper portion of the cart 10. In FIG. 6, the shelf 50, upper shelf supporting bar 22, the upper shelf backstop 24, and the side shelf support 32 are shown in cross section. As shown in FIG. 6, the shelf 50 includes a notch 52 proximate to an end of the shelf 50.

In FIG. 7, the shelf 50 has been tipped at an angle allowing the notched end of the shelf 50 to be inserted between the upper shelf supporting bar 22 and the upper shelf backstop 24. The shelf 50 is then lowered such that the notch 52 engages the upper shelf backstop 24, and such that the lower face of the shelf 50 rests on the shelf supporting bar 22. In addition, a side edge of the lower face of the shelf 50 rests on the side shelf support 32. The engaged position of the shelf 50 is shown in FIG. 8. A similar technique is used to engage the shelf in its lower position, in which the notch 52 engages the lower shelf backstop 24', and in which the shelf rests on the lower shelf supporting bar 22' and the lower side shelf support 32'.

As discussed above, the cart 10 illustrated in FIGS. 1-8 is dimensioned to be easily maneuverable, even in a crowded aisle in a retail store. In a presently preferred embodiment of the invention, the cart 10 has a footprint of approximately 40.750"×27.000". The work surface 60 is positioned approximately 40.565" above the ground and is approximately 27.000" across and 8.000" deep. The bag hook 80, which may be suitably fabricated from a ⅜" diameter aluminum rod, is approximately 3.000" below the top of the cart and has a length of approximately 1.708". The tip of the bag hook 80 is angled at approximately 29.97° from horizontal. It will be appreciated that these dimensions may be modified without departing from the spirit of the invention.

FIG. 9 shows a flowchart of a method 100, according to a further aspect of the invention, for fabricating a restocking cart. In step 102, a wheeled base is provided. In step 104, an upright frame is mounted to the base. In step 106, a side support frame is mounted to the base. The base, upright frame and side support frame are mounted with respect to each to form an open cargo bay. In step 108, a horizontal work surface is mounted to the rear face of the upright frame. The horizontal work surface projects rearwardly from the upright frame for use in performing a restocking function. In step 110, a storage compartment is mounted to the rear face of the upright frame below the work surface. In addition to the steps set forth in FIG. 9, a method according to the present invention may include additional steps including, for example, providing a shelf support assembly for supporting a shelf that is removably attachable to the upright frame. It should be noted that the method 100 shown in FIG. 9 may be modified without departing from the spirit of the invention. For example, the order of steps 102-110 may be modified, as desired.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. An inventory stocking cart, comprising:

a wheeled base;

an upright frame extending upwardly from the base, the upright frame having a front face and a rear face;

a side support frame extending upwardly from the base and abutting the upright frame, base, the upright frame and the side support frame together forming a cargo bay that is open towards a side of the cart opposite the side support frame and towards the cart's front; and a repositionable cantilevered shelf, the repositionable shelf having a first position in which said shelf is supported by the upright frame and extends horizontally from the upright frame to divide the cargo bay into an upper portion and a lower portion, and a second position in which the cargo bay has a different profile than when the repositionable shelf is in the first position.

2. The inventory stocking cart of claim 1 wherein the second position of the repositionable cantilevered shelf is a storage position in which the cargo bay is open on three sides facilitating utilizing the cart to move boxes containing items to be shelved which would not fit in the cargo bay with the repositionable cantilevered shelf in the first position, facilitating access to a box or boxes supported by the wheeled base, and storage of the inventory stocking cart when not in use by allowing a rear of a first cart to be positioned over a front of a second cart.

3. The inventory stocking cart of claim 1 further comprising:

a horizontal work surface projecting rearwardly from a rear face of the upright frame.

4. The inventory stocking cart of claim 3 further comprising:
a storage compartment attached to the rear face of the upright frame and arranged below the horizontal work surface for storing empty cardboard containers wherein a user of the inventory stocking cart may readily place a box of products to be shelved on the horizontal work surface, open the box, shelve the items, break down the box, and temporarily store it in the storage compartment.

* * * * *